March 17, 1964
E. H. BRENNAN
3,125,190
NUT COVER ASSEMBLY
Filed Nov. 22, 1961
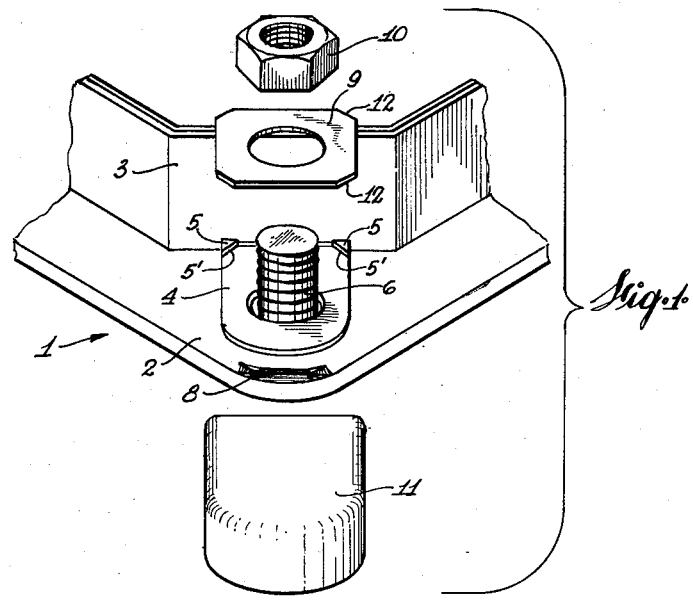
Fig.1
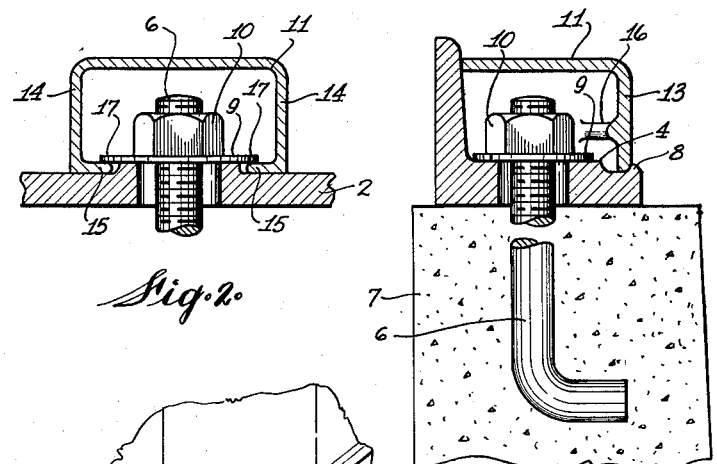
Fig.2
Fig.3
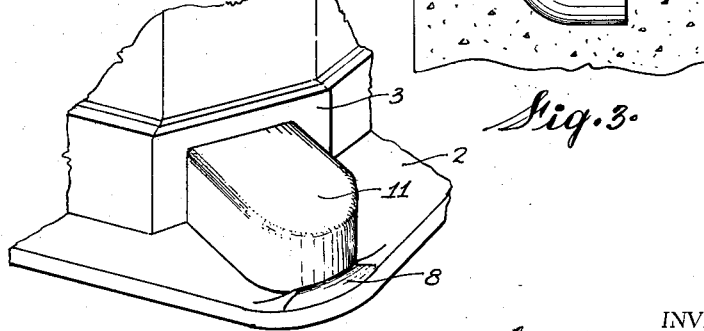
Fig.4
INVENTOR
Edward H. Brennan
BY Harold P. Weir
ATTORNEY

United States Patent Office 3,125,190
Patented Mar. 17, 1964

3,125,190
NUT COVER ASSEMBLY
Edward H. Brennan, Calgary, Alberta, Canada, assignor to Barber Machinery Limited, Calgary, Alberta, Canada
Filed Nov. 22, 1961, Ser. No. 154,215
2 Claims. (Cl. 189—29)

This invention relates to a nut cover assembly in which the nut cover is attached securely to a base member in such a way that the means of its attachment is completely concealed.

It is an object of this invention to provide a nut cover assembly of simple design, one which may be easily and inexpensively made and installed, and which includes a nut cover characterized by its lack of threaded attachment, drive attachment, welding or the like.

The nut cover assembly of this invention can be adapted for use in varying circumstances but offers distinct advantages in the manufacture and installation of street light standards where it is desired to provide a nut cover that is securely attached and in addition, one in which the means of its attachment is completely concealed from the public and in particular, children.

The nut cover assembly of this invention, in its simplest form, comprises a base plate having a pad thereon and a bolt-receiving opening extending through said plate and pad, a bolt-receiving washer arranged for seating on said pad and having side edges extending beyond said pad to overhang said plate, means on said pad to restrain rotation of said washer, a projecting cam on said plate, and a nut cover having internal lips engageable between said overhanging side edges of said washer and said plate and a forward wall engageable with said cam to retain said cover in fixed position on said plate. These and other features of the nut cover assembly will be further described with reference to the accompanying drawings in which, FIGURE 1 is an exploded perspective view showing the component parts of the assembly;

FIGURE 2 is a front sectional view,

FIGURE 3 is a side sectional view; and

FIGURE 4 is a perspective view of the assembled unit.

In the drawings one corner of a structural member 1 is shown having a base plate 2, angular and, as shown, substantially perpendicular walls 3, a raised pad or platform 4 provided with shoulders 5 and adapted to receive a bolt 6 which is anchored in a concrete or like base 7, and a retaining rib 8 consisting of a raised arcuate portion situated on the outer edge of said base plate 2 opposite wall 3 and in line with the forward end of pad 4. It will be observed that said shoulders 5 abut angular wall 3 and have inclined inner edges 5' which diverge from said wall. Also shown in the drawings are a washer 9, a nut 10, and a nut cover 11. Said washer and said nut are adapted to receive the bolt 6, and in addition said washer is characterized by having inclined corners 12 of substantially complementary configuration to the inclined edges 5' of the shoulders 5 whereby when said washer is seated on pad 4 its inclined corners 12 will engage said shoulders 5 and thus prevent rotative movement of the washer.

The nut cover 11 of this invention may comprise a simple casting or the like of any suitable material such as mild steel, aluminum or the like. As shown in the drawings it has a forward end wall 13, an open back, and two side walls 14, the bottom edges of which extend inwardly to form two internal lip or flange portions 15. The walls of the nut cover may be reinforced for added strength by the presence of reinforcing ribs such as that indicated in FIGURE 3 by numeral 16.

In FIGURE 2 and FIGURE 3 the means of secure attachment is shown. The washer 9 sits on and projects beyond the sides of pad 4 thus forming two overhanging portions 17 which serve as guide and retaining means for the lips 15 of the nut cover. After the washer 9 has been locked in position, the nut cover is inserted in place with lips 15 under the overhanging edges 17 of the washer 9 and driven into position against the angular side wall 3 of the base plate 2 by springing its forward end wall 13 over the retaining rib 8, thus holding the cover in place by engagement with said retaining rib.

FIGURE 4 shows the assembled unit and the successful concealment of the means of attachment of the nut cover to the base plate.

The nut cover can be removed from the assembled unit by inserting a chisel between the cover and the angular wall of the base plate and prying the cover out and over the retaining cam.

Should the nut cover fail to tighten properly, it can be removed and the overhanging edges of the washer bent down with a hammer for a tighter fit against the lips of the nut cover.

From the foregoing description it is apparent that the secure and concealed attachment of the nut cover of this invention is obtained by the provision of a nut cover having lips on the inner bottom edges of its two sides, a washer fixed in position on a platform of a base plate and having edge portions overhanging said platform to provide guide and retaining means for the lips of the nut cover, and a retaining cam on the base plate engaging the forward end of the nut cover.

I claim:

1. A nut cover assembly comprising a base plate having a raised portion providing a pad thereon and a bolt-receiving opening extending through said plate and pad, a bolt-receiving washer removably seated on said pad and having side edges extending beyond said pad to overhang said plate, a pair of spaced opposed shoulders on one end of said pad, said washer having inclined corner edges engaged with said shoulders to prevent rotation of said washer relative to said pad, a bolt fixed to a member below the base plate and extending upwardly through the plate, pad and washer, a nut on the upper end of the bolt tightened against the washer, a projecting rib on said plate forward of the opposite end of the pad, and a nut cover having a top, depending side walls with internal inwardly extending lips engaged between said overhanging side edges of said washer and said plate, and a forward wall engaged with said rib to retain said cover in fixed position on said plate, said pad having a transverse width less than the transverse distance between the inner edges of the lips, said side walls defining an open end whereby the cover can be slid over the nut from the forward end of the pad with the lips beneath the overhanging side edges of the washer.

2. A nut cover assembly comprising a base plate having a raised portion providing a pad thereon and a bolt-receiving opening extending through said plate and pad, a bolt-receiving washer removably seated on said pad and having side edges extending beyond said pad to overhang said plate, raised shoulder means on one end of said pad, said washer having an edge thereof engaged with said shoulder means to prevent rotation of said washer relative to said pad, a bolt fixed to a member below the base plate and extending upwardly through the plate, pad and washer, a nut on the upper end of the bolt tightened against the washer, a projecting rib on said plate forward of the opposite end of the pad, and a nut cover having a top, depending side walls with internal inwardly extending lips engaged between said overhanging side edges of said washer and said plate, and a forward wall engaged with said rib to retain said cover in fixed position on said plate, said pad having a transverse width less than the transverse distance between the inner edges of the lips, said side walls defining an open end whereby the cover can be slid over the nut from the forward end of the pad with the lips beneath the overhanging side edges of the washer.

References Cited in the file of this patent

UNITED STATES PATENTS

| | | |
|---|---|---|
| 958,991 | Burton | May 24, 1910 |
| 1,914,773 | Fisher | June 20, 1933 |
| 1,924,435 | Homer | Aug. 29, 1933 |
| 1,947,639 | Brain | Feb. 20, 1934 |
| 2,294,555 | Hendrie | Sept. 1, 1942 |

FOREIGN PATENTS

| | | |
|---|---|---|
| 848,605 | Germany | Sept. 4, 1952 |